May 10, 1949.  H. M. HABERMAN  2,469,877
COMBINATION TOOL
Filed March 30, 1946
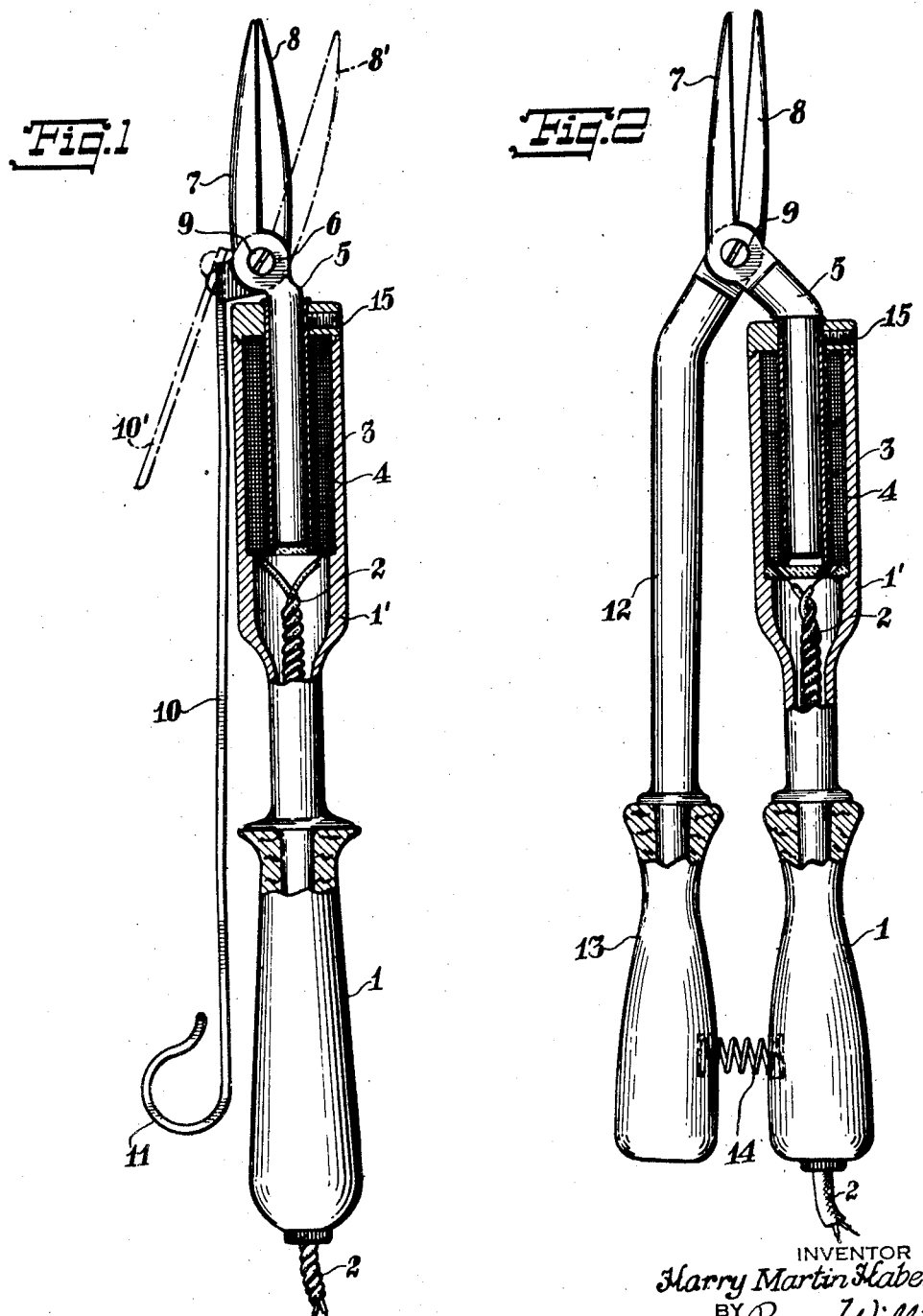
INVENTOR
Harry Martin Haberman
BY Roger Williams
ATTORNEY Patented May 10, 1949

2,469,877

UNITED STATES PATENT OFFICE 2,469,877

COMBINATION TOOL

Harry M. Haberman, New York, N. Y.

Application March 30, 1946, Serial No. 658,461

4 Claims. (Cl. 219—21)

This invention relates to a combination tool. More especially it relates to a tool of the type which allows or provides for the dual operations of simultaneously heating and applying mechanical forces involving compression or twisting motions, to one or more objects.

In the performance of mechanical operations wherein there is involved the employment of a bond subject to thermal actuation, either when this bond is being applied, or is being removed from one or more elements, it is often desirable that the fusion of the bond, bringing about its change from a solid to a liquid state, be simultaneously accompanied by the exertion of some mechanical force upon the elements which are to be bonded together. Conversely, it is frequently desired to separate from one another elements which have previously been joined together by mechanical operations involving deformation or alteration of the shape of one or more of the bodies, as well as by the use, additionally thereto, of a thermally actuated bond, in which case the separation of these elements from one another requires that the thermal bond be maintained in a fluid state while the deformations of the elements are removed, since separation of the elements is otherwise usually impossible, because of the deformations, which latter have been made with a view to causing a mechanical bonding action, such last bonding action persisting even after the thermal bond has ceased to exert any restraint upon free movements of the elements, with respect to one another.

As one specific example, and not by way of limitation, there may be cited the fastening together, or vice versa, of two metallic elements, such as two wires, or one wire and some other piece of metal, for the production of a joint which will be both mechanically strong, and which will possess low electrical resistance and will not alter in its properties by continued exposure to the atmosphere, even though exposed surfaces may oxidize by such exposure.

One illustration of the type of joining just described, is the use of solder to encase a joint already made by mechanical means, such as twisting. In the manufacture and assembly of electrical equipment, more particularly electronic devices, it is frequently the case that a very great number of unions of this type must be made, also frequently in closely confined spaces, economic considerations demanding that the joining operations be performed in a minimum of time, and with a minimum of tools. During the operative life of such equipment it frequently becomes desirable or necessary to break apart unions of the type last described, in order to test, or remove some electrical component, which has been made an integral part of the equipment by being joined to other components by means of unions of this double bonded type. Repair, replacement and rebuilding operations call both for the unmaking and remaking of such unions, frequently in large numbers. Salvage operations especially demand the breaking apart of a relatively great number of joints, and in this last case, the economic factors are especially severe, as the time involved must not equal the cost of the components recovered in the salvaging, and individual components are today produced in quantity production at very low cost.

In operations involving unions of the type last discussed, it has hitherto been found necessary to form the union in two separate steps, each step employing a different tool, suited only for that particular step. For example, a pair of pliers may be used to form the mechanical joint, and a soldering iron may then be used to apply to the joint a mass of solder, kept in fusion by the heat of the iron. This procedure involves, therefore, two distinct steps, performed subsequently to one another, and consuming a relatively great amount of time.

When the operation to be performed involves the breaking of a joint having both mechanical and thermal bonding, the problems become increasingly difficult. It is necessary that the solder, or other thermal bond, be brought to a state of fusion, and then that such bond be maintained in this state while the mechanical forces are applied to effect the distortion of the elements so that they may be separated, for example two wires cannot readily be untwisted from each other, unless the solder is kept fluid while the untwisting forces are applied to the wires. Two methods are at present employed to accomplish the desired result, but both these methods are time consuming and both demand upon the part of the operator a degree of speed and/or skill which increases the labor cost of the operation. If a soldering iron be first applied to the joint, to fuse the solder, the mechanical force, such as from a pair of pliers, must be applied to the joint within a very brief space of time, else the solder will again harden, and the operation will fail. If the operation must be performed upon a joint having low thermal storage and relatively great cooling surface, such as the union of two small wires, the time element becomes so short that this particular method is useless. Likewise if the operation takes place in a space into which only one tool at a time can be inserted, the time consumed in withdrawing the iron and inserting the pliers is too great for the operation to succeed.

The second method now in use, involves the simultaneous application of a heated iron, and of the pliers to the joint. Even when the joint is readily accessible, this method demands considerable dexterity on the part of the operator, including the employment of both hands simultaneously, therefore really calling for ambidexterity. Furthermore, space limitations often render this method impracticable, or cause the iron to bring about the fluxing of solder on some adjacent joint, which is extremely undesirable, and may demand a resoldering of such second joint, all this consuming time and entailing expense.

The present invention comprises a single tool, for the performance of operations of the character previously described, or for similar operations involving at least mechanical and thermal bonding, upon a single joint or union. This tool performs simultaneously the respective functions of a soldering iron and of a pair of pliers, the portion of the tool which is applied to the work being no larger than the size of the corresponding portion of a pair of pliers of the conventional type which would be demanded to perform the mechanical portion of the same operation.

One object of this invention is to provide a simple tool combining therein the functions of a pair of pliers and of a soldering iron.

Another object of this invention is to provide an instrument for simultaneously heating and applying mechanical forces to objects which are to be joined together or unjoined, where such joining involves the use of both mechanical and thermal bonding means.

Yet another object of this invention is to provide a tool capable of functioning as a pair of pliers, and having a portion which may readily be inserted into a conventional soldering iron of the type provided with means for removing and interchanging the heated point thereof.

Still another object of the present invention is to provide a combination soldering iron and pliers, in which the pliers may be operated with the jaws thereof either cold, or else heated sufficiently to flux a thermal bond, such as solder or the like.

Another purpose of this invention is to provide an electrically heated pair of pliers in which the heating may proceed simultaneously with the functioning of the pliers to apply mechanical forces to a work piece or pieces.

Yet another purpose of this invention is to provide a combination tool for forming or for taking apart joints which have been both mechanically fastened and soldered, which tool operates with increased speed and facility, and does not require exceptional dexterity on the part of the operator thereof.

Still another purpose of this invention is to provide an electrically heated pair of pliers of the long nose type, in which the electrical heating elements are situated relatively remote from the jaws of the pliers, so that the jaws may be inserted into relatively small spaces and into narrow openings.

An additional object of this invention is to provide a combination pair of pliers and soldering iron, in which the heat producing portion and the portion acting as pliers are readily separable from one another, so that a failure of either portion will demand only the replacement of one portion, whereby the time needed to restore the tool to operative condition is minimized, and whereby the expenses of repairs are kept at a minimum.

Further purposes and advantages of this invention will be apparent to those skilled in the art and reference is now made to the hereunto annexed drawings and to the following description thereof.

In the drawings—

Figure 1 is a longitudinal view, partly in cross section, of a combination tool embodying one form of this invention.

Figure 2 is a longitudinal view, partly in cross section, of an alternative form in which this invention may be embodied.

Referring now to Figure 1, reference numeral 1 denotes a suitably shaped handle, preferably formed of wood, or of some similar material having adequate thermal insulating properties. Through the hollow interior portion of this handle passes a conductor cord, 2, comprising a sufficient number of separate electrical wires to establish a complete electrical heating circuit therethrough, two such wires usually being sufficient.

Into the opposite end of the hollow handle is fastened a body portion 1', which is preferably formed of heat resistant material, such as metal or the like, and is conveniently made of circular cross-section, although any other cross-section may be employed, if desired. Within this body portion is contained an electrical heating unit 3, which may assume any convenient form, and is schematically indicated as a hollow coil, the outer diameter of the coil being limited by the interior diameter of the containing body portion, and the interior diameter being suited to receive therein an element later to be described. It is to be understood that the heating unit may be formed in other fashions, well known in the art, and does not necessarily fill the entire space between the interior surface of the body portion and the element inserted within the heating unit. For purposes of efficiency, to minimize heat loss by radiation form the outer surface of the body portion, there is preferably supplied a layer, 4, of any suitable insulating and heat resistant material, such as mica, or the like.

Within the hollow interior of the heating unit, which is preferably of uniform bore and of cylindrical configuration, although not necessarily so, there fits an element 5, having a cross-section corresponding to the cross section of the interior opening of the heating unit. While both these elements are here shown as circular in cross-section, it is to be understood that they may both be of rectangular cross section, or of any other geometrical form, but the greatest efficiency is obtained when they make with one another sufficiently close contact to allow ready transfer of heat.

Retention of element 5 in position is secured by the use of a suitable holding screw 15, preferably having a counter-sunk head. This method of assembly allows the ready separation of the two sections of the tool, when desired. The upper portion of element 5, which should be formed of material having good thermal conductivity and sufficient mechanical rigidity, continues outside of the heating element, being somewhat flattened at the portion 6, and continuing beyond this point in the shape of one jaw, or nose, 7, of a pair of pliers.

The other nose or jaw of the pliers consists of element 8, which is suitably pivoted to the portion 6 of the first described jaw, as by a screw 9, passing through the flattened portions of the respective jaws. The lower extremity of jaw 8, below the pivot 9, is prolonged by an extending portion 10, which may be considered as a handle. This handle terminates in a retrogradely bent portion 11, which last portion functions cojointly with handle 1, to allow manual control of the jaws of the instrument.

When it is desired to operate this instrument solely as a pair of pliers, the handle 1 is grasped in the hand, and one or more fingers are simultaneously employed to manipulate the bent portion 11, which latter portion may be covered with any suitable heat insulating material, if found necessary or desirable. The forcible separation of handle 1 and handle portion 11, causes jaws 7 and 8 to separate, so that jaw 8 assumes the position shown at 8', while handle 10 assumes the position partly indicated at 10'. Such separation of the jaws allows the work to be embraced therebetween, and squeezing together of the fingers then tends to close the jaws, thereby exerting upon the work held therebetween, the desired mechanical pressure.

When it is desired to operate this instrument as a combination tool, there is first applied to the heating coil 3, via the intermediary of conductor cord 2, an electric current so chosen and regulated that the development of heat in the coil, according to the well known law of electro-thermal conversion, that I²R equals the thermal energy liberated, will supply to element 5 sufficient heat to maintain jaw 7 at the desired operating temperature, that is at a temperature sufficient to melt the solder, or other thermal bond, with which it is placed in contact. After thermal equilibrium has been reached, at the proper operating temperature, the plier portion of this instrument may then be manipulated as previously described. For example, when a soldered joint is held between the jaws of the instrument, the heat transmitted to the work from jaw 7, will melt the solder, and then, without change of position of the instrument being required, the plier action thereof will allow any mechanical bonding of the joint to be disengaged, as by twisting the pliers. It is to be noted that the solder is maintained in a fluid condition throughout the operation, so that it will not afford a mechanical bond to resist the untwisting action exerted by the pliers.

The assembly constituted by handle 1, body 1' and contained heating unit 3, may be constituted by a conventional soldering iron, of the well known type, wherein the tip is made removable or interchangeable, element 5, in the present instance, acting in lieu of a removable tip, and occupying the position normally assumed by such tip within the body and heating unit.

In Figure 2 is shown a modified form of construction, wherein jaw 8 is continued downwardly beyond the pivoted portion, by an extension 12, which is preferably formed integrally with the jaw portion, and is equipped at the lower extremity thereof with a second heat insulating and gripping handle 13, of a type and size to match handle 1, an expansion spring 14 serving to normally keep the two handles separated, and consequently the two jaws open. When the two handles are grasped and squeezed together, the force of the spring will be overcome, and the jaws will close so as to exert the desired mechanical pressure on the work. It will be evident that the spring may be of another suitable type, for example a flat spring, and that it may be placed at another point, for example near the pivot point of the two jaws.

The embodiment of this invention shown in Figure 2 is especially suited for operations where the instrument is comparatively small, so that both handles fit readily within a single hand of the operator. The remaining portions of this type of instrument may be identical with the corresponding portions of the form shown in Figure 1, and bear corresponding reference numerals.

While there have been shown and described certain embodiments of this invention, such have been by way of example, and not of limitation. Many changes and variations will be apparent to those skilled in the art, and accordingly the scope of this invention is limited only by the hereunto appended claims.

What is claimed and what it is desired to secure by United States Letters Patent, is:

1. A combination pair of pliers and soldering iron, comprising two hinged jaws, a first handle extending from one jaw, a thermal conducting member extending from the other jaw below the hinge thereof, an electrical heating element embracing at least part of said thermal conducting member, a body member holding said heating element therewithin, and a second handle extending from said body member and mating with said first handle, the portions of jaws above said hinge being relatively narrow and free from obstructions to the mechanical functioning thereof.

2. A combination tool, including a pair of pliers having attached to one jaw thereof and located below the point of union of the jaws, a metallic cylinder, an electrical heating element formed as a hollow cylinder and embracing said metallic cylinder, a body member at least partly enclosing said heating element and being provided with a first handle, and a second co-operating handle extending from the other jaw of the pliers, whereby the tip ends of the pliers are indirectly heated by said remotely situated heating element.

3. A separable tool, comprising a pair of pliers having one elongated handle portion, and a second separable handle portion, containing therein an electrical heating element, and slidable over a thermally conductive portion of said pliers, whereby to heat at least one jaw thereof, both said handle portions being located below the hinge of said pliers, thereby leaving the mechanically functioning tips of said pliers free from bulky elements, so that said tips can enter relatively small openings.

4. As an article of manufacture, a pair of pliers adapted for use in conjunction with a hollow heating unit, including a pair of jaw members, means pivoting one jaw member relative to the other jaw member, an elongated handle member substantially rigidly attached to one jaw member below the pivoting means, and a heat conducting body extending from the other jaw member below the pivoting means and having at least a portion thereof of a size and shape adapted to enter said hollow heating unit, and to be held by means for retaining said heat conducting body within said heating unit, whereby at least one of said jaw members can become heated by heat transferred thereto from said heat conducting body, whereby said heating unit is kept at a distance from the work acted upon by the portions of said jaw members above said pivoting means.

HARRY M. HABERMAN.

REFERENCES CITED

The following references are of record in the file of this patent:

UNITED STATES PATENTS

| Number | Name | Date |
| --- | --- | --- |
| 466,520 | Cook et al. | Jan. 5, 1892 |
| 1,455,696 | Wright | May 15, 1923 |
| 1,845,475 | Benson | Feb. 16, 1932 |
| 2,221,422 | Kuehl | Nov. 12, 1940 |
| 2,258,844 | Brown et al. | Oct. 14, 1941 |